United States Patent
Fukutomi et al.

(10) Patent No.: US 7,149,232 B2
(45) Date of Patent: Dec. 12, 2006

(54) LASER NOISE CANCEL CIRCUIT AND OPTICAL DISK DEVICE

(75) Inventors: Yoshio Fukutomi, Chiba (JP); Toru Nagara, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 11/108,534

(22) Filed: Apr. 18, 2005

(65) Prior Publication Data

US 2005/0265200 A1 Dec. 1, 2005

(30) Foreign Application Priority Data

Apr. 19, 2004 (JP) .............................. 2004-122373

(51) Int. Cl.
*H01S 3/00* (2006.01)
(52) U.S. Cl. ................................. 372/38.08; 372/38.01
(58) Field of Classification Search ............... 372/38.1, 372/38.01, 38.08
See application file for complete search history.

(56) References Cited

U.S. PATENT DOCUMENTS

| | | | |
|---|---|---|---|
| 4,691,308 A | | 9/1987 | Takagi et al. |
| 5,491,682 A | * | 2/1996 | Dohmeier et al. ..... 369/124.12 |
| 5,684,769 A | | 11/1997 | Kaneko |
| 6,026,071 A | | 2/2000 | Kimura |
| 2002/0085468 A1 | | 7/2002 | Kobayashi |

FOREIGN PATENT DOCUMENTS

JP 10-124919 5/1998

OTHER PUBLICATIONS

Shu-Chuan Huang and Mohammed Ismail, "Novel Fully-Integrated Active Filters Using the CMOS Differential Difference Amplifier" IEEE, Aug. 14, 1989, pp. 173-176.

* cited by examiner

*Primary Examiner*—Armando Rodriguez
(74) *Attorney, Agent, or Firm*—Robert J. Depke; Rockey, Depke, Lyons & Kitzinger LLLC

(57) ABSTRACT

Disclosed herein is a laser noise cancel circuit for reducing laser noises in a reproduction system for an optical disk device including, a gain-variable amplifying noise cancel circuit for amplifying a monitor output signal for laser light, a first low-pass filter for extracting low frequency signal components of a monitor output signal for noise canceling, a second low-pass filter for extracting low frequency signal components, a negative return loop circuit for controlling a gain in the amplifying noise cancel circuit based on the low frequency signal components of the monitor output signal for noise canceling extracted as well as on the low frequency signal components of the reproduced high frequency signal extracted, to determine the low frequency signal component rate of the monitor output signal for noise canceling as identical to the low frequency signal component rate of the reproduced high frequency signal, and an arithmetic circuit for generating the reproduced high frequency signal with the laser noise components cancelled by canceling the laser noise components extracted from the monitor output signal for noise canceling with a low frequency signal component rate determined as identical to the low frequency signal component rate of the reproduced high frequency signal with the laser noise components of the reproduced high frequency signal.

4 Claims, 7 Drawing Sheets

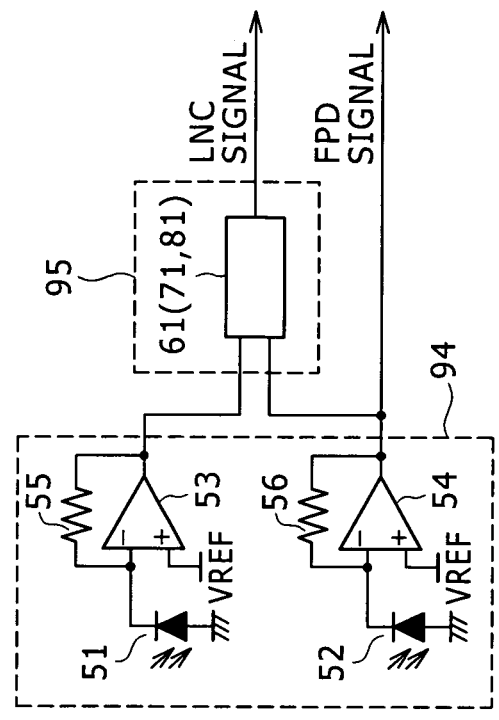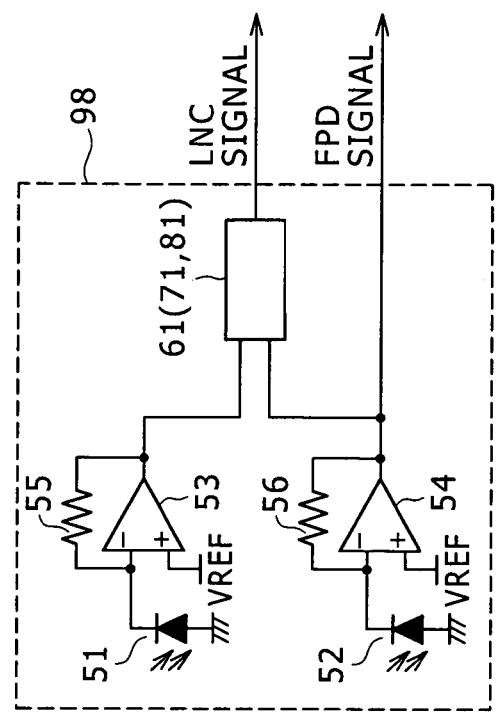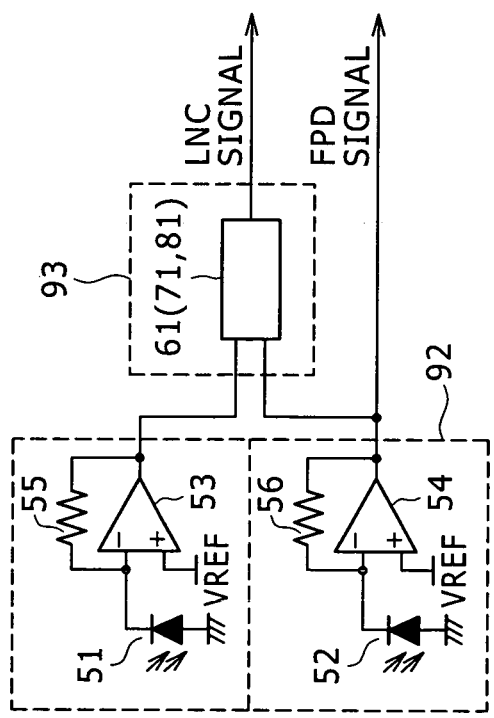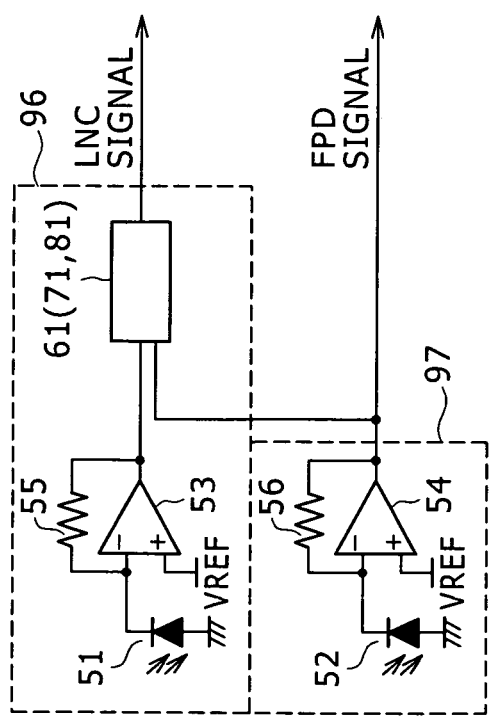

LASER NOISE CANCEL CIRCUIT AND OPTICAL DISK DEVICE

This application claims priority of Japanese Patent Application No. JP2004-122373, filed Apr. 19, 2004, which is incorporated herein by reference.

BACKGROUND OF THE INVENTION

The present invention relates to a laser noise cancel circuit reducing laser noises arising from returned light from a disk or temperature change, and to an optical disk device using the laser noise cancel circuit.

Conventional optical disk recorder and reproducing devices have the problem that laser noises may increase due to returned light from a disk or temperature change, and may have adverse effects on reproduced signals. There has been a method of reducing such laser noises, as already disclosed in Japanese Patent Laid-open No. Hei 10-124919, that is a laser noise cancel (LNC) system for canceling laser noises by subtracting laser light noise components monitored directly from light signals modulated by the disk. With the conventional technique using the subtraction method to obtain a high depression effect against laser noises, however, in the LNC arithmetic section, the level of a RF signal, which is a reproduced signal of data recorded on an optical disk, should be brought precisely identical to the level of a front photodiode signal (hereinafter referred to as a FPD signal), which can be used as a signal for monitoring a light emitting status of the laser as well as a signal for laser noise canceling, and also the level of a FPD signal needs to be readjusted in each case because the level of a RF signal tends to vary due to individual differences between disks and dispersion within a surface.

FIG. 7 and FIG. 8 are circuit diagrams each showing configuration of a conventional laser noise cancel circuit.

First, a laser noise cancel system using the conventional subtraction method will be explained with reference to FIG. 7. While a positive phase input terminal of a differential amplifier 121 is applied with a certain bias voltage VREF, a reverse phase input terminal is connected to a cathode of a main photodiode 111 (hereinafter referred to as a main PD) with an anode thereof connected to GND, and with a terminal of a return resistor 131 of which the other terminal is connected to an output terminal of the differential amplifier 121.

Similarly, a positive phase input terminal of a differential amplifier 122 is applied with a certain bias voltage VREF, a reverse phase input terminal of the differential amplifier 122 is connected to the cathode of a front photodiode 112 (hereinafter referred to as a front PD) with the anode connected to GND, and with a terminal of a return resistor 132 with the other terminal thereof connected to an output terminal of the differential amplifying circuit 122. The output terminals of the differential amplifiers 121 and 122 are connected to inputs of the arithmetic circuit 140 to output a RF signal with reduced laser noise components (LNC signal), while the output terminal of the differential amplifying circuit 122 simultaneously outputs a FPD signal. These circuit components are composed of a single or a plurality of integrated circuit elements.

When laser light reflected by a disk is introduced into the main PD 111, the light is subjected to photoelectric conversion by the main PD 111 to become a current signal, and amplified by the differential amplifier 121 and then by the return resistor 131 to become a voltage signal to be outputted as a RF signal from the output terminal of the differential amplifier 121.

On the other hand, when light from laser is introduced into the front PD 112 monitoring a quantity of laser light, the light is subjected to photoelectric conversion by the front PD 112 to become a current signal, which is amplified and converted by the differential amplifier 122 and then by the return resistor 132 to become a voltage signal, thus providing an FPD signal corresponding on quantity of laser light at the output terminal of the differential amplifier 122.

The laser light introduced into the main PD 111 contains laser noises emitted from the laser as well as signals recorded on the disk, and similarly the light introduced into the front PD 112 from the laser contains laser noises emitted from the laser. By inputting these signals, both of which contain those laser noise components, from differential amplifier 121 and 122 into the arithmetic circuit 140 to cancel the laser noise components, a LNC signal can be extracted.

FIG. 8 is a circuit diagram showing a specific example of a laser noise cancel circuit containing a conventional arithmetic circuit 140 shown in FIG. 7. In FIG. 8, the same signs are assigned to the same or corresponding components as shown in FIG. 7 and descriptions are omitted herefrom.

In the amplifying circuit 140, one of input terminals of an adder 169 executing operation for canceling laser noises from a RF signal is connected to an output terminal of an amplifier 151 for amplifying the RF signal outputted from a differential amplifier 121, and the other input terminal is connected to an output terminal of an amplifier 152 for amplifying a FPD signal outputted from a differential amplifier 122 in reverse phase via a high pass filter (hereinafter referred to as HPF) 160 for shielding DC components. The reason for shielding DC components of the FPD signal for noise canceling by HPF 160 is to prevent the DC component of the FPD signal for noise canceling from affecting a DC component of the RF signal. In addition, since the DC voltage outputted from the HPF 160 is not determined by the HPF 160, the output terminal of the HPF 160 is connected via a resistor 168 to VREF so that a DC bias voltage is applied thereto.

By adjusting gains in the amplifier 151 and 152 according to a gain control signal provided from outside of the laser noise cancel circuit, and also by adjusting the noise levels between the RF signal and the FPD signal to be identical to each other, laser noises are canceled by the adder 169 so that a LNC signal with depressed laser noises is outputted. To cancel laser noises effectively, a cut-off frequency of the HPF 160 is to be set at a frequency which is adequately smaller than a band of the RF signal, and which can follow changes in a reflection coefficient from disk to disk and influences by decentering.

The description above assumes that the amplifier 151 is a gain-variable amplifier, but the amplifier 151 may be a gain-fixed amplifier, or may be omitted.

As the optical disk device for canceling laser noises, there is an optical disk device for canceling laser noise components contained in a read information signal obtained from a read information signal processor with a phase-inverted variable detected signal obtained from a second photo-receiver, by phase-inverting a variable detected signal obtained from the second photo-receiver and adding it to a read output signal obtained from a first photo-receiver or to the read information signal obtained from the read information signal processor is disclosed illustratively in Japanese Patent Laid-open No. Hei 10-124919.

The laser noise cancel circuit and optical disk device each based on the conventional technology as described above have the following drawbacks. Since a noise level of a RF signal, likewise RF signals, depends on a reflection coefficient of a disk or other factors and varies depending on the conditions such as non-uniformity of disks to be reproduced or irregularities on a surface of each disk, in order to constantly obtain the maximized noise canceling effects, it has to be adjusted in such a way that laser noise levels emerging in the outputs of amplifiers 151 and 152 should be identical to each other, and therefore the control is difficult and it is not easy to obtain a sufficient depression effect on laser noises.

SUMMARY OF THE INVENTION

The present invention was made in the light of the circumstances as described above, and an object of the present invention is to provide a laser noise cancel circuit and an optical disk device capable of adjusting gains in amplifiers in conjunction with laser noise canceling automatically with high accuracy.

In order to achieve the object described above, a laser noise cancel circuit according to the present invention includes a gain-variable amplifying noise cancel circuit for amplifying a monitor output signal for laser light irradiated to an optical disk; a first low-pass filter for extracting low frequency signal components of a monitor output signal for noise canceling outputted from the amplifying noise cancel circuit; a second low-pass filter for extracting low frequency signal components of a reproduced high frequency signal from the optical disk; a negative return loop circuit for controlling a gain in the amplifying noise cancel circuit based on the low frequency signal components of the monitor output signal for noise canceling extracted by the first low-pass filter as well as on the low frequency signal components of the reproduced high frequency signal extracted by the second low-pass filter, to determine the low frequency signal component rate of the monitor output signal for noise canceling outputted from the amplifying noise cancel circuit as identical to the low frequency signal component rate of the reproduced high frequency signal; and an arithmetic circuit for generating the reproduced high frequency signal with the laser noise components cancelled by canceling the laser noise components extracted from the monitor output signal for noise canceling with a low frequency signal component rate determined by the negative return loop circuit as identical to the low frequency signal component rate of the reproduced high frequency signal with the laser noise components of the reproduced high frequency signal.

In order to achieve the object above-described, an optical disk device according to the present invention includes a laser noise cancel circuit for reducing laser noises in a reproduction system, the laser noise cancel circuit including; a gain-variable amplifying noise cancel circuit for amplifying an monitor output signal for laser light irradiated to an optical disk; a first low-pass filter for extracting low frequency signal components of a monitor output signal for noise canceling outputted from the amplifying noise cancel circuit;

a second low-pass filter for extracting low frequency signal components of a reproduced high frequency signal from the optical disk; a negative return loop circuit for controlling a gain in the amplifying noise cancel circuit based on the low frequency signal components of the monitor output signal for noise canceling extracted by the first low-pass filter as well as on the low frequency signal components of the reproduced high frequency signal extracted by the second low-pass filter, to determine the low frequency signal component rate of the monitor output signal for noise canceling outputted from the amplifying noise cancel circuit as identical to the low frequency signal component rate of the reproduced high frequency signal; and an arithmetic circuit for generating the reproduced high frequency signal with the laser noise components cancelled by canceling the laser noise components extracted from the monitor output signal for noise canceling with a low frequency signal component rate determined by the negative return loop circuit as identical to the low frequency signal component rate of the reproduced high frequency signal with the laser noise components of the reproduced high frequency signal.

With the present invention, there are advantageously provided a laser noise cancel circuit and an optical disk device having a high noise reduction effect by adjusting gains in amplifiers in conjunction with laser noise cancel, automatically and in a highly accurate manner.

BRIEF DESCRIPTION OF THE DRAWINGS

FIGS. 6A, 6B, 6C and 6D are illustrative views showing how many integrated elements are employed for composing the entire laser noise cancel circuit including a photo-receiver;

DETAILED DESCRIPTION OF PREFERRED EMBODIMENTS

Figure 1:
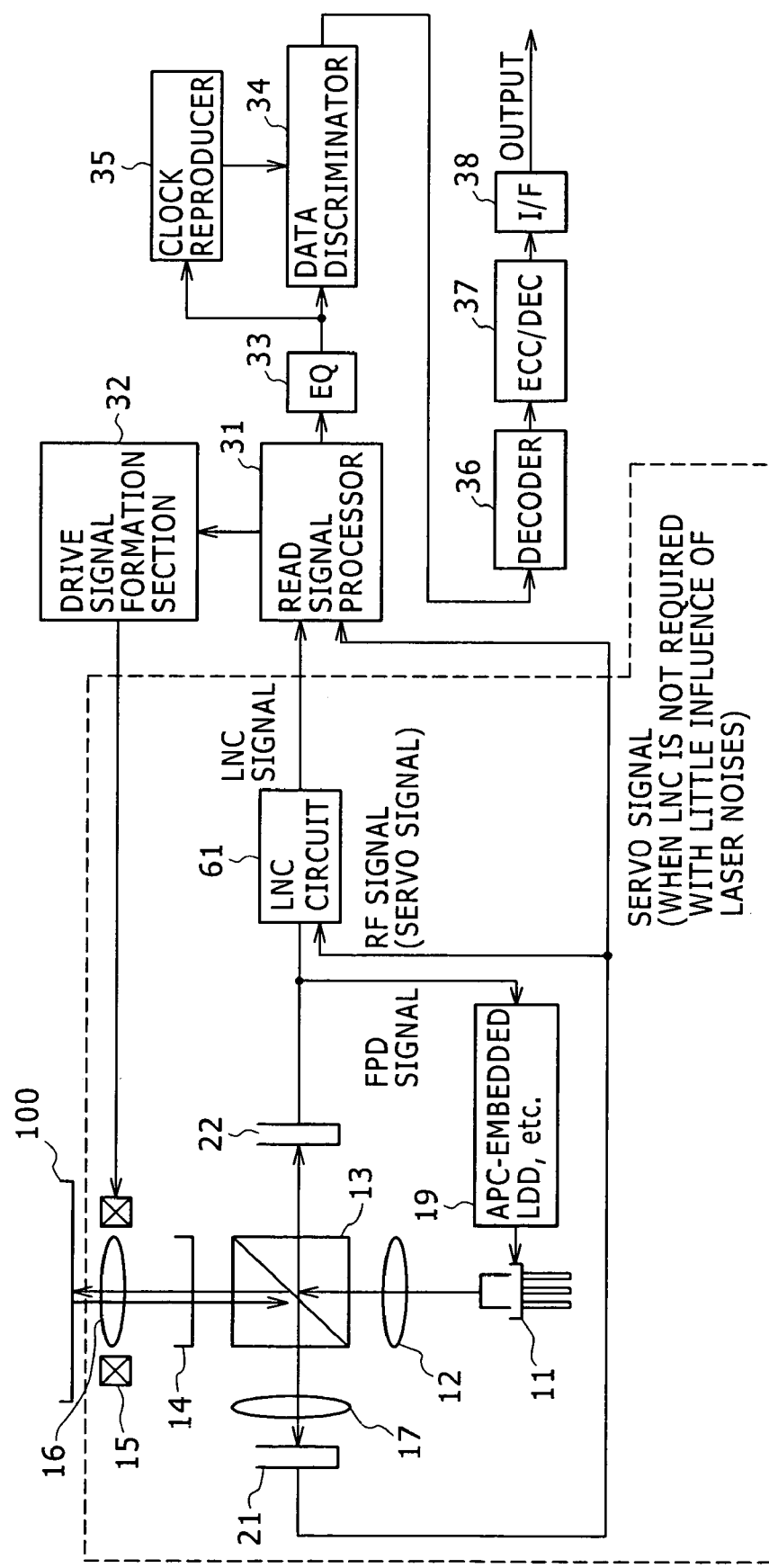
FIG. 1 is a block diagram for illustrating an optical disk device according to the first embodiment of the present invention.

The object of providing a laser noise cancel circuit having a high noise reduction effect by adjusting gains in amplifiers in conjunction with laser noise cancel, automatically and in a highly accurate manner is achieved by amplifying a monitor output signal for laser light irradiated to an optical disk via a gain-variable amplifying noise cancel circuit; by extracting low frequency signal components of a monitor output signal for noise canceling outputted from the amplifying noise cancel circuit via a first low-pass filter; by extracting low frequency signal components of a reproduced high frequency signal from the optical disk via a second low-pass filter; by controlling a gain in the amplifying noise cancel circuit based on the low frequency signal components of the monitor output signal for noise canceling extracted by the first low-pass filter as well as on the low frequency signal components of the reproduced high frequency signal extracted by the second low-pass filter via a negative return loop circuit to determine the low frequency signal component rate of the monitor output signal for noise canceling outputted from the amplifying noise cancel circuit as identical to the low frequency signal component rate of the reproduced high frequency signal; and by generating the reproduced high frequency signal with the laser noise components cancelled by canceling the laser noise components extracted from the monitor output signal for noise canceling with a low frequency signal component rate determined by the negative return loop circuit as identical to the low frequency signal component rate of the reproduced high frequency signal with the laser noise components of the reproduced high frequency signal via an arithmetic circuit.

Also, the object of providing an optical disk device having a high noise reduction effect by adjusting gains in amplifiers in conjunction with laser noise cancel, automatically and in a highly accurate manner is achieved by including a laser noise cancel circuit by amplifying a monitor output signal for laser light irradiated to an optical disk via a gain-variable amplifying noise cancel circuit; by extracting low frequency signal components of a monitor output signal for noise canceling outputted from the amplifying noise cancel circuit via a first low-pass filter; by extracting low frequency signal components of a reproduced high frequency signal from the optical disk via a second low-pass filter; and by controlling a gain in the amplifying noise cancel circuit based on the low frequency signal components of the monitor output signal for noise canceling extracted by the first low-pass filter as well as on the low frequency signal components of the reproduced high frequency signal extracted by the second low-pass filter via a negative return loop circuit to determine the low frequency signal component rate of the monitor output signal for noise canceling outputted from the amplifying noise cancel circuit as identical to the low frequency signal component rate of the reproduced high frequency signal; and for generating the reproduced high frequency signal with the laser noise components cancelled by canceling the laser noise components extracted from the monitor output signal for noise canceling with a low frequency signal component rate determined by the negative return loop circuit as identical to the low frequency signal component rate of the reproduced high frequency signal with the laser noise components of the reproduced high frequency signal via an arithmetic circuit.

[First Embodiment]

FIG. 1 is a block diagram explaining an optical disk device using a laser noise cancel circuit according to this first embodiment.

The optical disk device includes a light pickup section 1, a read signal processor 31, a drive signal formation section 32, an equalizer 33, a data discriminator 34, a clock reproducer 35, a decoder 36, an ECC (Error Correcting Code) decoder 37, and an interface section 38.

The light pickup section 1 includes a laser diode 11, a collimator lens 12, a polarizing splitter 13, a quarter wave plate 14, a coil system 15 for controlling focus, an objective lens 16, a condenser lens 17, an integrated element (hereinafter referred to as a PDIC) 21 embedding a main photodiode (hereinafter referred to as a main PD) and an amplifier, an integrated element (hereinafter referred to as a FPDIC) 22 embedding an front photodiode (hereinafter referred to as a front PD) and an amplifier, a laser noise cancel circuit 61, and a laser diode driving circuit 19.

The laser diode driving circuit 19 is connected to the laser diode 11, and controls light emitted from the laser diode 11 by controlling its output electric current. A portion of the laser output light emitted from the laser diode 11 and passing through the polarizing splitter 13 is converted into circularly polarized light by the quarter wave plate 14, and then is condensed by passing through the objective lens 16 to be irradiated onto an optical disk 100. While the polarizing splitter 13 transmits a portion of the laser output light from the laser diode 11 to irradiate it onto the optical disk 100, the polarizing splitter 13 also reflects the rest of the output light towards the FPDIC 22 to insert it into the front PD. The laser light reflected by the optical disk 100 passes through the objective lens 16 and the quarter wave plate 14 in the direction reverse to incoming, and then is reflected by the polarizing splitter 13 to be introduced into the main PD in the PDIC 21.

The main PD in the PDIC 21 having received the light containing signal components recorded on the optical disk 100 converts the light signal into an electric signal, and then the electric signal amplified in an amplifier integrating the PDIC 21 is outputted from the PDIC 21 as a reproduced RF signal to be supplied to the laser noise cancel circuit 61.

The laser output light emitted from the laser diode 11 having been reflected towards the FPDIC 22 by the polarizing splitter 13 is received by the front PD in the FPDIC 22. This laser light received by the front PD is converted into an electric signal, after being amplified by an amplifier in the FPDIC 22, to be supplied to the laser noise cancel circuit 61 and is also used as an FPD signal for controlling the laser output light.

From the laser noise cancel circuit 61, the RF signal with laser noises having been removed is outputted to the read signal processor 31 as a read output signal.

In FIG. 1, the laser noise cancel circuit 61 is incorporated in the light pickup section 1, however, it may also be possible that the laser noise cancel circuit 61 is not incorporated in the light pickup section 1.

The read signal processor 31 generates and outputs a focus error signal representing, based on the reading output signal above-described, focus status of the laser beam incoming onto an information recording surface of the optical disk 100; a tracking error signal representing deviation status of an incident position, from the center in each recording track, of the laser beam incoming onto the information recording surface of the optical disk 100; and a read information signal representing digital information data read from recording tracks on the information recording surface on the optical disk 100.

Servo signals, such as a focus error signal or a tracking error signal outputted from the read signal processor 31, are supplied to the drive signal formation section 32.

The drive signal formation section 32 forms a focus control signal based on the focus error signal and a tracking control signal based on the tracking error signal, which are supplied to the coil system 15 for tracking control and focus control. In addition, the read information signal outputted from the read signal processor 31 is supplied to the equalizer 33.

The equalizer 33 corrects the frequency properties about the read information signal, and then the read information signal with corrected frequency properties obtained from the equalizer 33 is supplied to the data discriminator 34 and to the clock reproducer 35.

Based on data clocks in the read information signal above-described, the clock reproducer 35 reproduces a clock signal CK, which is supplied to the data discriminator 34. In the data discriminator 34, data are discriminated in response to the clock signal CK related to the read information signal above-described, and then digital information data based on the read information signal described above is obtained.

Then, the digital information data from the data discriminator 34 is supplied to the decoder 36, which decodes the digital information data, thus reproduced output data being obtained from the decoder 36. This reproduced output data are supplied to the ECC decoder 37 to be processed for error correction and the like, and then the data are supplied to external device(s) via the interface section 38.

Figure 2:
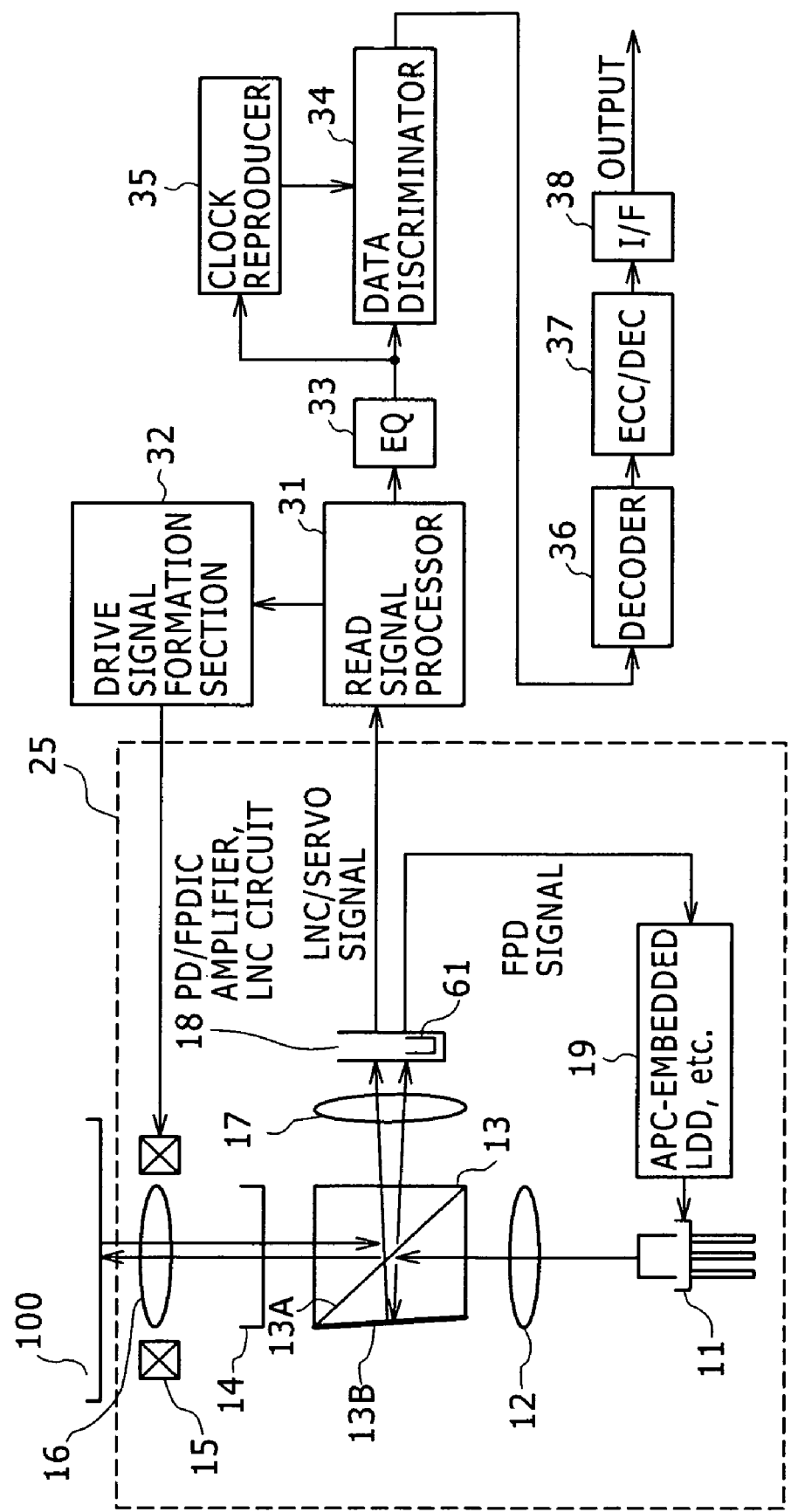
FIG. 2 is a block diagram for illustrating an optical disk device with a light pickup section having configuration different from that in the first embodiment.

FIG. 2 is a block diagram explaining an optical disk device with a light pickup section having the configuration different from that of the light pickup section 1 as shown in FIG. 1.

In the optical disk device shown in FIG. 2, the difference from the optical disk device shown in FIG. 1 consists in the point that an optical system in a light pickup section 25 and a main PD and a front PD in a photo-receiver are configured with an integrated element.

In FIG. 2, the same signs are assigned to the same or corresponding sections as those shown in FIG. 1 and descriptions are omitted. A polarizing splitter 13 in the optical disk device shown in FIG. 2 includes a polarizing splitter surface 13A and a total reflection surface 13B. It is possible to obtain a reproduced RF signal by returned light from an information recording surface on an optical disk 100 and a FPD signal by reflected light from the total reflection surface 13B in the polarizing splitter 13 simultaneously and individually.

A photo-receiver circuit 18 for reproduction includes a main PD and a front PD, which are composed in an integrated element, and a laser noise cancel circuit 61.

Figure 3:
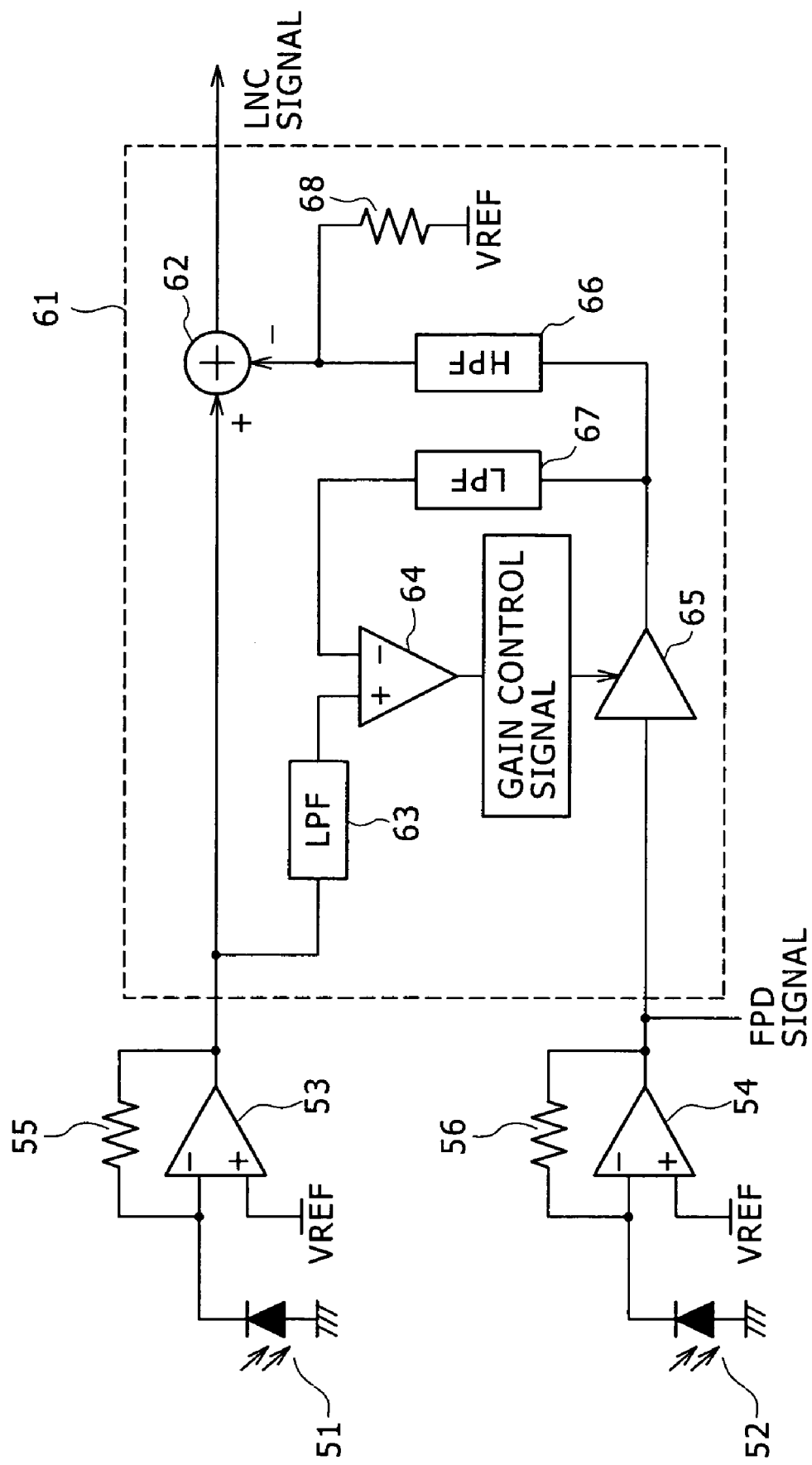
FIG. 3 is a circuit diagram showing general configuration of a laser noise cancel circuit including a main PD, a front PD and amplifiers in the first embodiment of the present invention.

FIG. 3 is a circuit diagram showing general configuration of the entire laser noise cancel circuit including the photo-receiver of the optical disk device shown in FIG. 1 or FIG. 2. First of all, configuration of the main PD and the front PD, and the laser noise cancel circuit 61 shown in FIG. 3 is described. In a main PD 51, its anode is connected to the ground, while its cathode is connected to a reverse phase input terminal of a differential amplifier 53, into which light reflected by the optical disk 100 is introduced. Also in a front PD 52, the anode is connected to the ground, while its cathode is connected to a reverse phase input terminal of a differential amplifier 54. This front PD 52 is used for monitoring quantity of laser light from the laser diode 11, and light form a laser is introduced thereto. A return resistor 56 is connected between an output terminal and the reverse phase input terminal of the differential amplifier 54.

The differential amplifier 53 amplifies a current signal outputted from the main PD 51 and outputs it as a voltage signal. The differential amplifier 54 also amplifies a current signal outputted from the front PD 52 and outputs it as a voltage signal.

An output terminal of the differential amplifier 53 amplifying the output from the main PD 51 is connected to one of input terminals of an adder (an arithmetic circuit) 62 and to an input terminal of a low-pass filter (a second low-pass filter, hereinafter referred to as LPF) 63. An output terminal of the LPF 63 is connected to a positive phase input terminal of a differential amplifier (a differential amplifier for gain control) 64.

In turn, an output terminal of the differential amplifier 54 amplifying the output from the front PD 52 is connected an input terminal of an amplifier (an amplifying noise cancel circuit) 65, which is gain-adjustable according to a gain control signal. An output terminal of the amplifier 65 is connected to input terminals of a HPF 66 and a LPF (a first low-pass filter) 67.

An output of the HPF 66 is inputted into the other input terminal of the adder 62 in the reverse phase. An output terminal of the LPF 67 is connected to a reverse phase input terminal of the differential amplifier 64. In addition, in order to supply a DC bias voltage, a reference voltage VREF is connected to the output terminal side of the HPF 66 via a resistor 68.

Next, operations of the laser noise cancel circuit 61 shown in FIG. 3 are described.

The laser noise cancel circuit forms a negative return loop by comparing a DC level of the reproduced RF signal outputted from the differential amplifier 53 to a DC level of the FPD signal for laser noise canceling outputted from the amplifier 65 with the differential amplifier 64, and returning the resultant output to the amplifier 65 as a gain control signal so that the DC level of the output from the amplifier 65 is always identical to the DC level of the output from the differential amplifier 53.

Since both the reproduced RF signal outputted from the differential amplifier 53 and the FPD signal outputted from the differential amplifier 54 are signals from the same light source, the laser diode 11, ratios of the degrees between DC components and noise components contained in the laser are always identical, so that, by keeping the DC level of the FPD signal outputted from the amplifier 65 always identical to the DC level of the reproduced RF signal outputted from the differential amplifier 53, a laser noise level of the reproduced RF signal is always kept identical to a laser noise level of the FPD signal for laser noise canceling.

Consequently, the laser noise level of the reproduced RF signal and that of the FPD signal for laser noise canceling both of which are supplied to the adder 62 are always identical, and the reproduced RF signal containing laser noises is supplied to one input terminal of the adder 62, while the FPD signal for laser noise canceling, containing laser noises in the same level as the level of the laser noises contained in the reproduced RF signal above-described, is supplied to the other input terminal of the adder 62 in the reverse phase from the amplifier 65.

In this case, to the FPD signal for laser noise canceling supplied to the other input terminal of the adder 62 in reverse phase, a DC component is added by the reference voltage VREF on the output terminal side of the HPF 66 via a resistor 68. As a result, a LNC signal with the laser noises described above highly efficiently depressed can always be obtained from the adder 62. Furthermore, if the gain adjustable range by the amplifier 65 is large enough, gains can arbitrarily be determined independently from the level of the FPD signal for laser noise canceling above-described.

In order to cancel laser noises efficiently, a cut-off frequency is, likewise in the conventional way, to be set at a frequency which is adequately smaller than the band of the RF signal and allows for following changes in reflection coefficient between disks and influences by the decentering.

As described above, in this first embodiment, there is provided the effect that it is possible to provide a laser noise cancel circuit and an optical disk device, in which, with a view to the fact that ratios of the degrees between DC components and noise components contained in the laser are identical, by determining the DC level of the FPD signal for laser noise canceling outputted from the amplifier 65 to be identical to the DC level of the reproduced RF signal outputted from the differential amplifier 53, by determining the laser noise level of the reproduced RF signal to be identical to the laser noise level of the FPD signal for laser noise canceling, by supplying the reproduced RF signal containing laser noises to one input terminal of the adder 62, while supplying the FPD signal for laser noise canceling containing laser noises in the same level as the level of the laser noises contained in the reproduced RF signal above-described to the other input terminal of the adder 62 in reverse phase, the configuration is designed so as to cancel the laser noises above-described each other in the adder 62, so that even when the laser noises is varied by variable disk reflection coefficients depending on individual disks or by temperature changes, laser noises can be reduced automatically and effectively.

[Second Embodiment]

Figure 4:
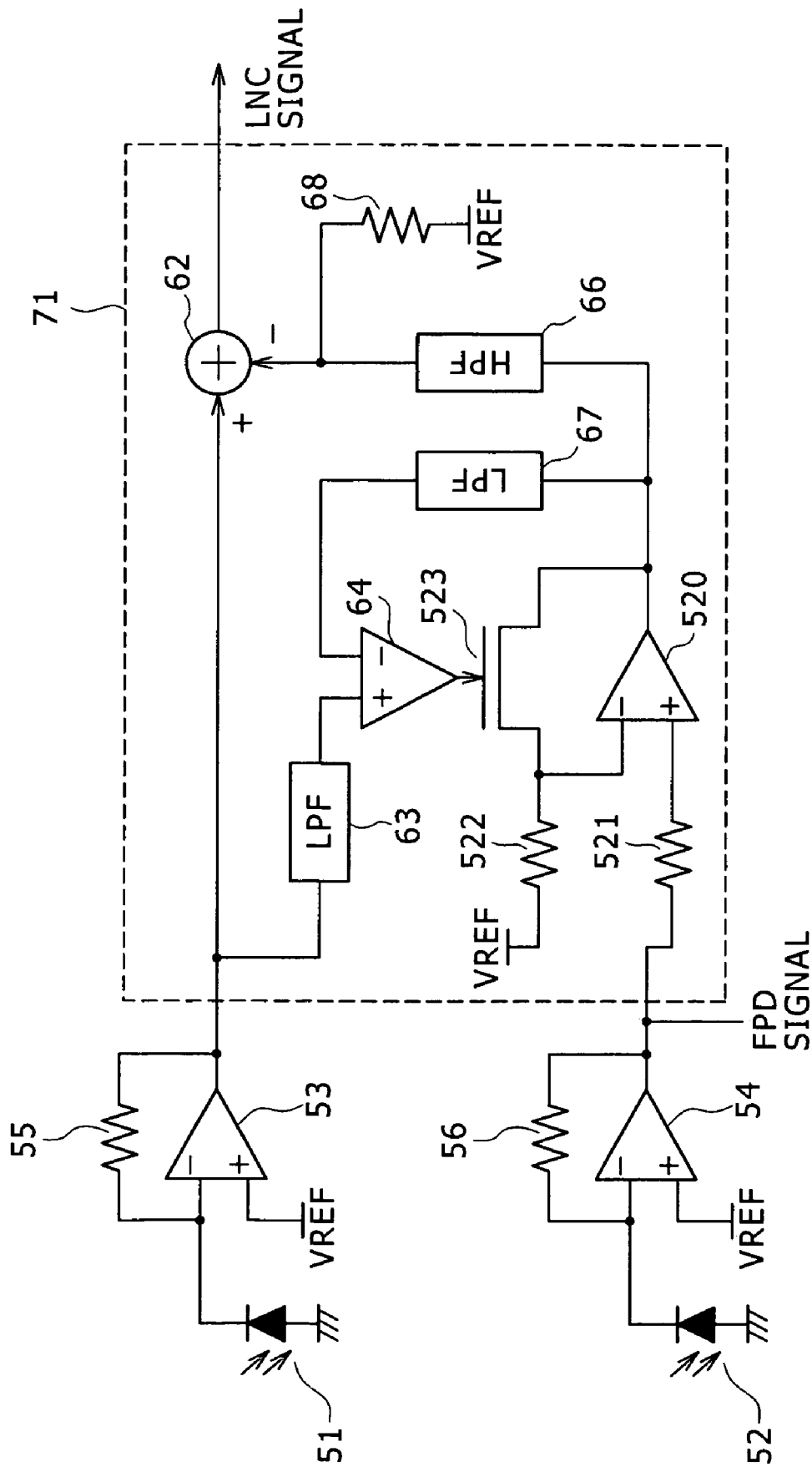
FIG. 4 is a circuit diagram showing a specific example of a laser noise cancel circuit in the second embodiment of the present invention.

FIG. 4 is a circuit diagram showing a specific example of the laser noise cancel circuit 61 shown in FIG. 3. In FIG. 4, the same signs are assigned to the same circuit elements as those shown in FIG. 3 and descriptions are omitted herefrom.

In a laser noise cancel circuit 71 shown in FIG. 4, the amplifier 65 shown in FIG. 3 is replaced with a non-inverting amplifying circuit including a differential amplifier 520, resistors 521 and 522, and a MOS resistor (MOS resistor element) 523, so that application of the MOS resistor 523 as a return resistor leads a resistance value into variable, and by using the MOS resistor 523 as a return resistor, a resistance value of the MOS resistor 523 can be adjusted. Also by using a MOS resistor as a return resistor, the output from a differential amplifier 64 and a gain from the noninverting amplifying circuit is automatically adjusted, so as to determine a DC level of the output from the differential amplifier 520 to be identical to a DC level of the output of a differential amplifier 53.

It may be concerned that, when inputting a large signal, the linearity problem may arise from use of the MOS resistor 523 as a return resistor, however, it may not be a significant problem because an output level of the FPD signal remains constant during reproduction needing LNC operation and a dynamic range is not required.

As described above, also in this second embodiment, a laser noise cancel circuit and an optical disk device can be provided to obtain the similar effects as those provided in the first embodiment described above.

[Third Embodiment]

Figure 5:
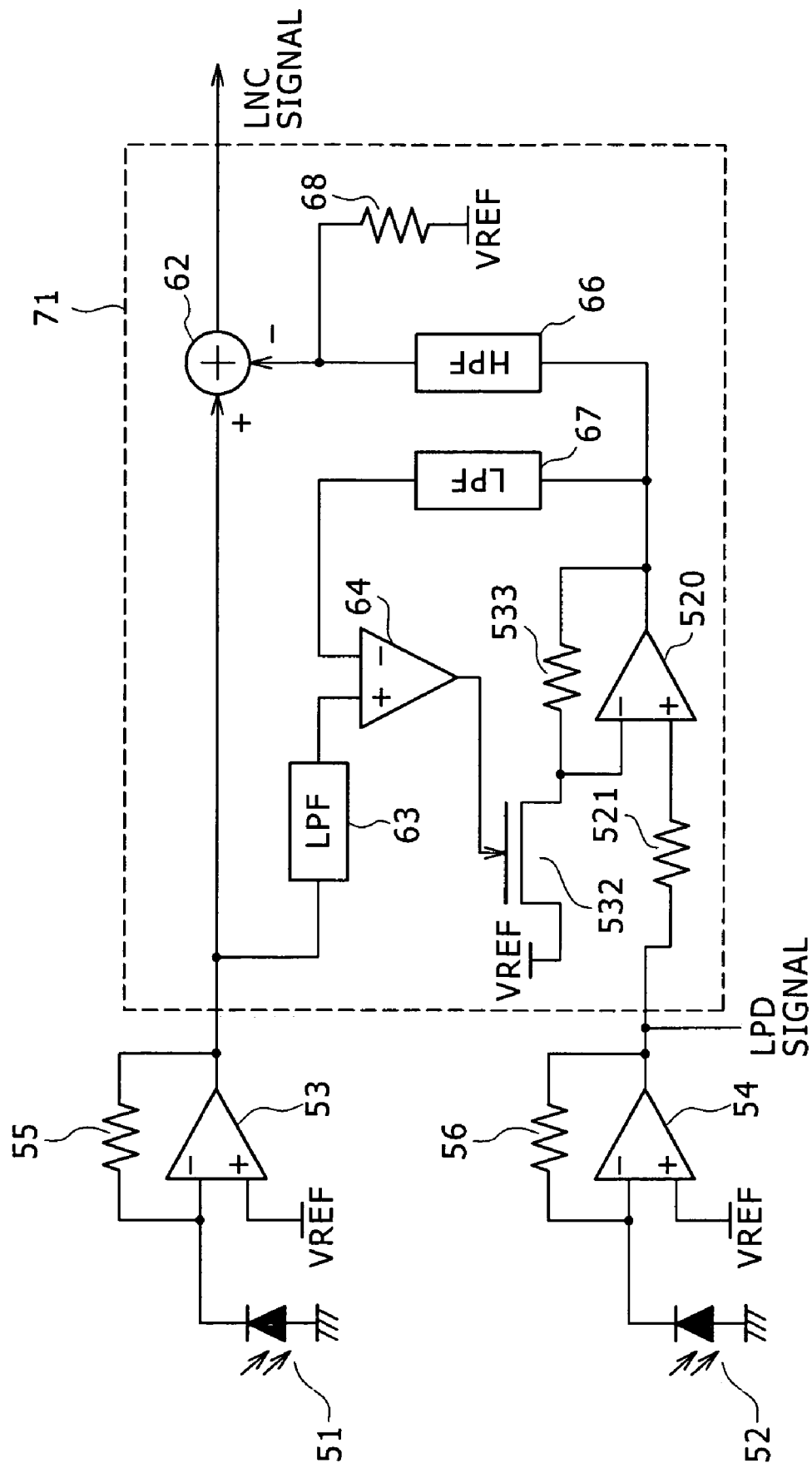
FIG. 5 is a circuit diagram showing another specific example of a laser noise cancel circuit in the third embodiment of the present invention.
Figure 7:
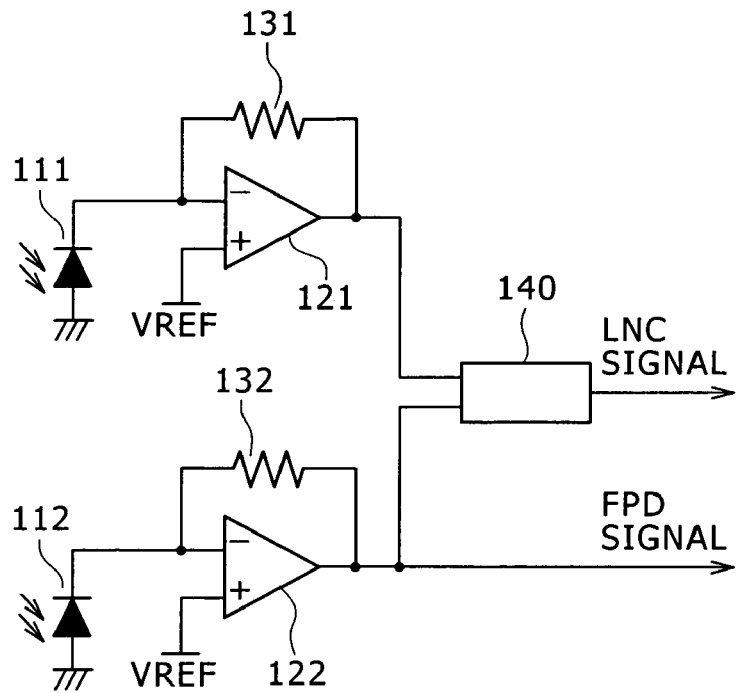
FIG. 7 is a circuit diagram showing configuration of a conventional laser noise cancel circuit.
Figure 8:
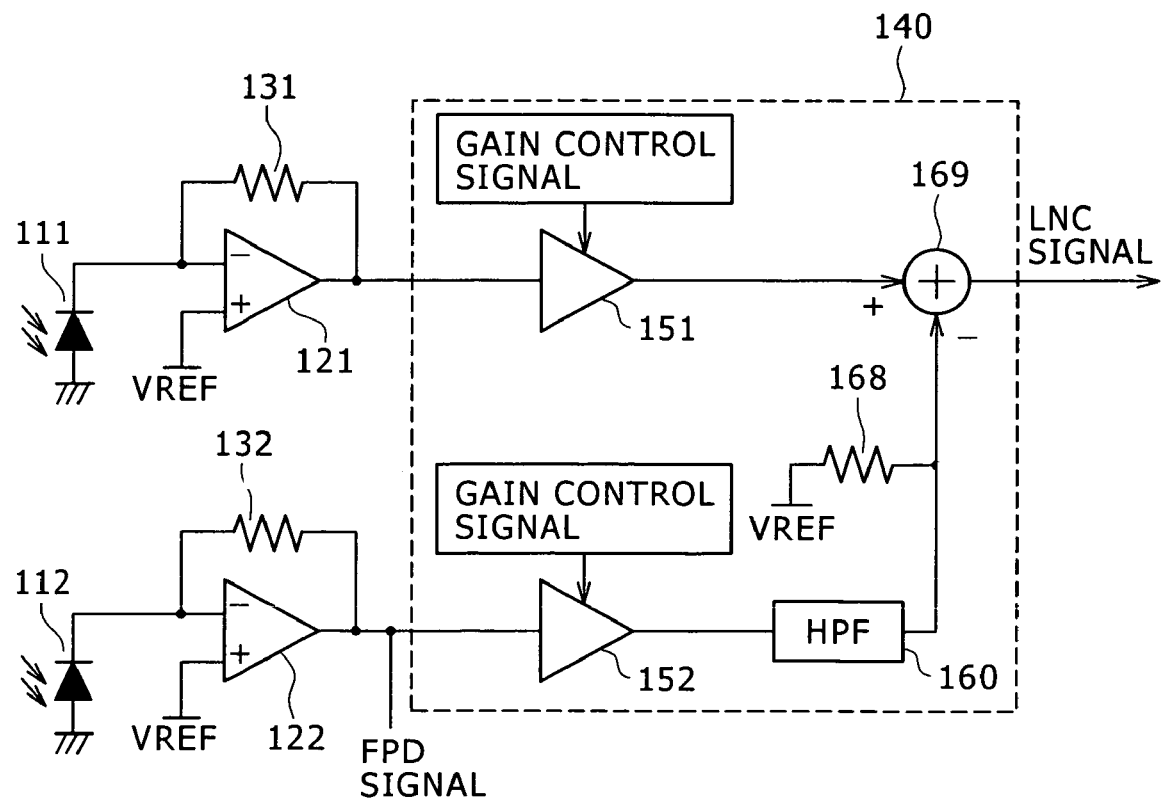
FIG. 8 is another circuit diagram showing configuration of a conventional laser noise cancel circuit.

FIG. 5 is a circuit diagram showing another specific example of the laser noise cancel circuit 61 shown in FIG. 3.

In FIG. 5, the same signs are assigned to the same circuit elements as those shown in FIG. 3 and FIG. 4, and descriptions thereof are omitted herefrom.

In a laser noise cancel circuit 81 shown in FIG. 5 in the third embodiment, the amplifier 65 shown in FIG. 3 is replaced with a non-inverting amplifying circuit including a differential amplifier 520, resistors 521 and 533, and a MOS resistor (MOS resistor element) 532. Using a fixed resistor 533 as a return resistor for the differential amplifier 520, while inserting the MOS resistor 532 as a resistor between a reverse phase input terminal of the differential amplifier 520 and a reference voltage VREF, by adjusting a resistant value of this resistor 532 with the output from a differential amplifier 64, a gain from the noninverting amplifying circuit is automatically adjusted, so as to determine a DC level of the output from the differential amplifier 520 to be identical to a DC level of the output from a differential amplifier 53. When this configuration employed, the connections on the input side of the differential amplifier 64 are reversed to the configuration shown in FIG. 4.

As described above, also in this third embodiment, a laser noise cancel circuit and an optical disk device can be provided to obtain the similar effects as those provided in the first embodiment described above.

[Fourth Embodiment]

Furthermore, although not shown in the drawings, in the first, second and third embodiments described above, when a level of a reproduced RF signal of the output from the differential amplifier 53 is small, a further amplifier may be introduced in the next stage from the differential amplifier 53. In this case, there is an advantage of increase in a noise canceling rate, because a differential propagation delay, due to a difference in the number of blocks on the signal paths of a reproduced RF signal and a FPD signal for laser noise canceling, is reduced in the adder 62.

The configuration described above the first, second and third embodiments is explained assuming a case where an electric current outputted from the PD is converted into a voltage signal to amplify and transmit as a voltage signal; but an electric current outputted from the PD may be amplified and transmitted as a current signal.

As described above, also the forth embodiment, a laser noise cancel circuit and an optical disk device can be provided to obtain the similar effects provided in the first embodiment described above.

[Fifth Embodiment]

Next, a chip configuration will be explained for an entire laser noise cancel circuit including a photo-receiver explained in the first, second, third and forth embodiments.

FIGS. 6A, 6B, 6C and 6D are illustrative views showing how many integrated elements are used to compose the entire laser noise cancel circuit including a photo-receiver. FIG. 6A shows a case where a main PD and an amplifier for reproducing RF signals are composed in an integrated element designated as numerical reference 91, a front PD and an amplifier for monitoring laser power are composed in an integrated element designated as 92, and a laser noise cancel circuit for LNC arithmetic is composed in an integrated element designated as 93; and then an entire laser noise cancel circuit including a photo-receiver includes three integrated elements.

Also FIG. 6B shows a case where a main PD and an amplifier for reproducing RF signals, and a front PD and an amplifier for monitoring laser power are configured with an integrated element designated as 94; and a laser noise cancel circuit for LNC arithmetic is configured with an integrated element designated as 95; and therefore the entire laser noise cancel circuit including a photo-receiver includes two integrated elements.

FIG. 6C shows a case where a main PD and an amplifier for reproducing RF signals, and a laser noise cancel circuit for LNC arithmetic are configured with an integrated element designated as 96; and a front PD and an amplifier for monitoring laser power is composed in an integrated element designated as 97, and the entire laser noise cancel circuit including a photo-receiver includes two integrated elements.

Also FIG. 6D shows a case where a main PD and an amplifier for reproducing RF signals, a front PD and an amplifier for monitoring laser power, and a laser noise cancel circuit for LNC arithmetic are configured with an integrated element designated as 98; and then an entire laser noise cancel circuit including a photo-receiver are configured with one integrated element.

The entire laser noise cancel circuit including a photo-receiver are configured with one integrated element may apply to the photo-receiver circuit 19 of the optical disk device in FIG. 2.

As described above, also in this fifth embodiment, a laser noise cancel circuit and an optical disk device can be provided to obtain the similar effects to those provided the first embodiment above-described.

While the preferred embodiments of the present invention have been described using the specific terms, such description is for illustrative purposes only, and it is to be understood that changes and variations may be made without departing from the spirit or scope of the following claims.

What is claimed is:

1. A laser noise cancel circuit for reducing laser noise in a reproduction system for an optical disk device comprising:
   a gain-variable amplifying noise cancel circuit for amplifying a monitor output signal for laser light irradiated to an optical disk;
   a first low-pass filter for extracting low frequency signal components of a monitor output signal;
   a second low-pass filter for extracting low frequency signal components of a reproduced high frequency signal from said optical disk;
   a negative return loop circuit for controlling a gain in said amplifying noise cancel circuit based on the low frequency signal components of the monitor output signal extracted by said first low-pass filter as well as the low frequency signal components of the reproduced high frequency signal extracted by said second low-pass filter; and
   an arithmetic circuit for generating said reproduced high frequency signal with laser noise components cancelled by canceling the laser noise components extracted from said monitor output signal;
   wherein said negative return loop circuit comprises a differential amplifier for gain control based on comparison of a lower frequency signal component of the monitor output signal with respect to a low frequency signal component of said reproduced high frequency signal, and out putting a gain control signal to said amplifying noise cancel circuit to control a gain in said amplifying noise cancel circuit;
   wherein said amplifying noise cancel circuit comprises a non-inverting amplifying circuit comprising a differential amplifier using a resistance value variable MOS resistor element as the return resistor element and a resistance value of said MOS resistor is controlled according to said control signal for changing the gain.

2. A laser noise cancel circuit for reducing laser noise in a reproduction system for an optical disk device comprising:
   a gain-variable amplifying noise cancel circuit for amplifying a monitor output signal for laser light irradiated to an optical disk;
   a first low-pass filter for extracting low frequency signal components of a monitor output signal;
   a second low-pass filter for extracting low frequency signal components of a reproduced high frequency signal from said optical disk;
   a negative return loop circuit for controlling a gain in said amplifying noise cancel circuit based on the low frequency signal components of the monitor output signal extracted by said first low-pass filter as well as the low frequency signal components of the reproduced high frequency signal extracted by said second low-pass filter; and
   an arithmetic circuit for generating said reproduced high frequency signal with laser noise components cancelled by canceling the laser noise components extracted from said monitor output signal;
   wherein said negative return loop circuit comprises a differential amplifier for gain control based on comparison of a lower frequency signal component of the monitor output signal with respect to a low frequency signal component of said reproduced high frequency signal, and outputting a gain control signal to said amplifying noise cancel circuit to control a gain in said amplifying noise cancel circuit;
   wherein said amplifying noise cancel circuit comprises a noninverting amplifying circuit comprising a differential amplifier using a resistance value variable MOS resistor element as the return resistor element and a resistance value of said MOS resistor is controlled according to said control signal for changing the gain and further
   wherein said amplifying noise cancel circuit comprises a noninverting amplifying circuit comprising a differential amplifier with a resistance value variable MOS resistor element introduced between a reverse phase input and a reference voltage, and a resistance value of said MOS resistor element is controlled according to said gain control signal for changing the gain.

3. The laser noise cancel circuit according to claim 1, wherein low frequency signal components of said monitor output signal for noise canceling and said reproduced high frequency signal comprise a DC component.

4. A laser noise cancel circuit for reducing laser noise in a reproduction system for an optical disk device comprising:
   a single gain-variable amplifier for amplifying a monitor output signal for laser light irradiated to an optical disk;
   a first low-pass filter for extracting low frequency signal components of a monitor output signal;
   a second low-pass filter for extracting low frequency signal components of a reproduced high frequency signal from said optical disk;
   a negative return loop circuit for controlling a gain of said single gain-variable amplifier based on the low frequency signal components of the monitor output signal extracted by said first low-pass filter as well as the low frequency signal components of the reproduced high frequency signal extracted by said second low-pass filter; and
   an arithmetic circuit for generating said reproduced high frequency signal with laser noise components cancelled by canceling the laser noise components extracted from said monitor output signal; and
   further wherein said single gain-variable amplifier has an output that feeds both the negative return loop and the arithmetic circuit.

* * * * *